(12) United States Patent
Fatemi et al.

(10) Patent No.: US 12,257,873 B2
(45) Date of Patent: Mar. 25, 2025

(54) EDDY CURRENT DAMPER WITH ASYMMETRICAL FORCES

(71) Applicant: GM Global Technology Operations LLC, Detroit, MI (US)

(72) Inventors: Alireza Fatemi, Canton, MI (US); Thomas W. Nehl, Shelby Township, MI (US); Chandra S. Namuduri, Troy, MI (US); Brian K Saylor, South Lyon, MI (US); Nilesh D. Mankame, Ann Arbor, MI (US); Anthony Michael Coppola, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 464 days.

(21) Appl. No.: 17/863,514

(22) Filed: Jul. 13, 2022

(65) Prior Publication Data

US 2024/0017582 A1    Jan. 18, 2024

(51) Int. Cl.
*B60G 17/06*    (2006.01)
*B60G 13/16*    (2006.01)

(52) U.S. Cl.
CPC ............ *B60G 17/06* (2013.01); *B60G 13/16* (2013.01); *B60G 2202/25* (2013.01);
(Continued)

(58) Field of Classification Search
CPC .... F16F 15/035; F16F 2232/02; B60G 13/16; B60G 17/06; B60G 2202/25; B60G 2204/02; B60G 2206/41; B60G 2800/162
(Continued)

(56) References Cited

U.S. PATENT DOCUMENTS 4,180,296 A * 12/1979 Habermann ........ F16C 32/0476
310/90.5
5,521,448 A *  5/1996 Tecza ...................... F16C 27/08
310/90.5
(Continued)

FOREIGN PATENT DOCUMENTS

CN    203743282 U  *  7/2014
CN    110707900 A  *  1/2020
CN    215136409 U  * 12/2021

OTHER PUBLICATIONS

English machined translation of CN—215236409, Dec. 14, 2021.*

*Primary Examiner* — Robert A. Siconolfi
*Assistant Examiner* — San M Aung
(74) *Attorney, Agent, or Firm* — CANTOR COLBURN LLP

(57) ABSTRACT

A vehicle, suspension system and method of dampening a force on the suspension system is disclosed. The suspension system includes a damper having a first damping element and a second damping element configured to rotate relative to each other in response to a force received at the suspension system. The second damping element induces an eddy current in the first damping element during relative rotation. A feature of one at least one of the first damping element and the second damping element provides a first electrical resistance to the eddy current during relative rotation in a first direction and a second electrical resistance to the eddy current during relative rotation in a second direction. The first electrical resistance generates a first damping force and the second electrical resistance generates a second damping force.

20 Claims, 13 Drawing Sheets

(52) U.S. Cl.
CPC ...... *B60G 2204/62* (2013.01); *B60G 2206/41* (2013.01); *B60G 2600/22* (2013.01); *B60G 2800/162* (2013.01)

(58) Field of Classification Search
USPC ........................................................ 188/155
See application file for complete search history.

(56) References Cited

U.S. PATENT DOCUMENTS

| | | | |
|---|---|---|---|
| 2013/0037689 A1* | 2/2013 | Salte ................. | F16M 11/18 |
| | | | 188/267 |
| 2018/0241297 A1* | 8/2018 | Boeld ................. | H02K 49/04 |
| 2021/0116000 A1* | 4/2021 | Oberhauser ............ | F16D 3/80 |
| 2021/0301896 A1* | 9/2021 | Huang ................ | E04H 9/021 |

* cited by examiner

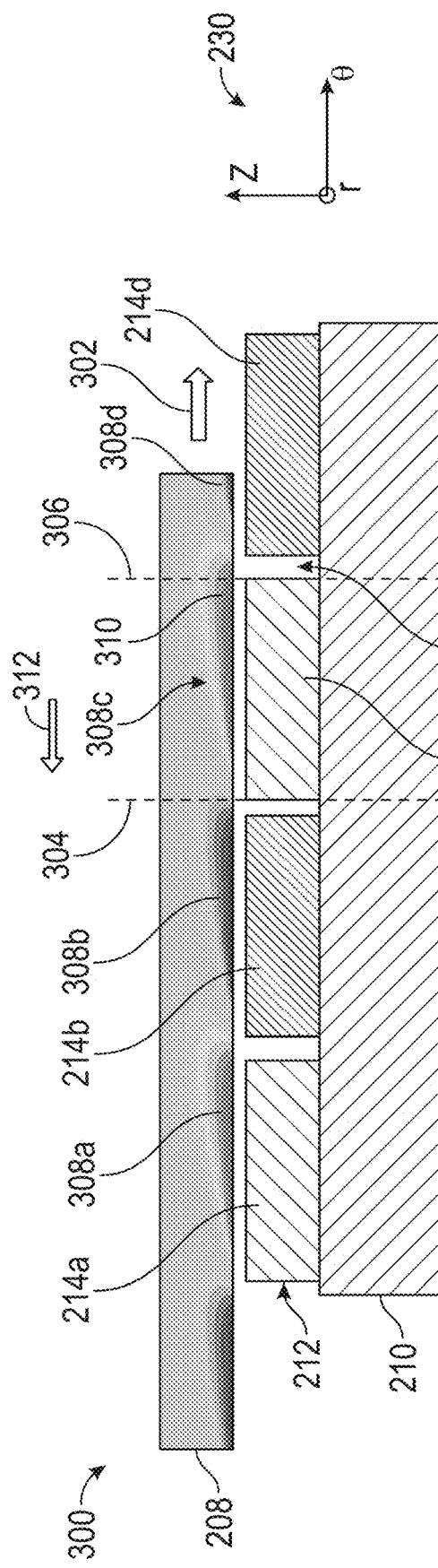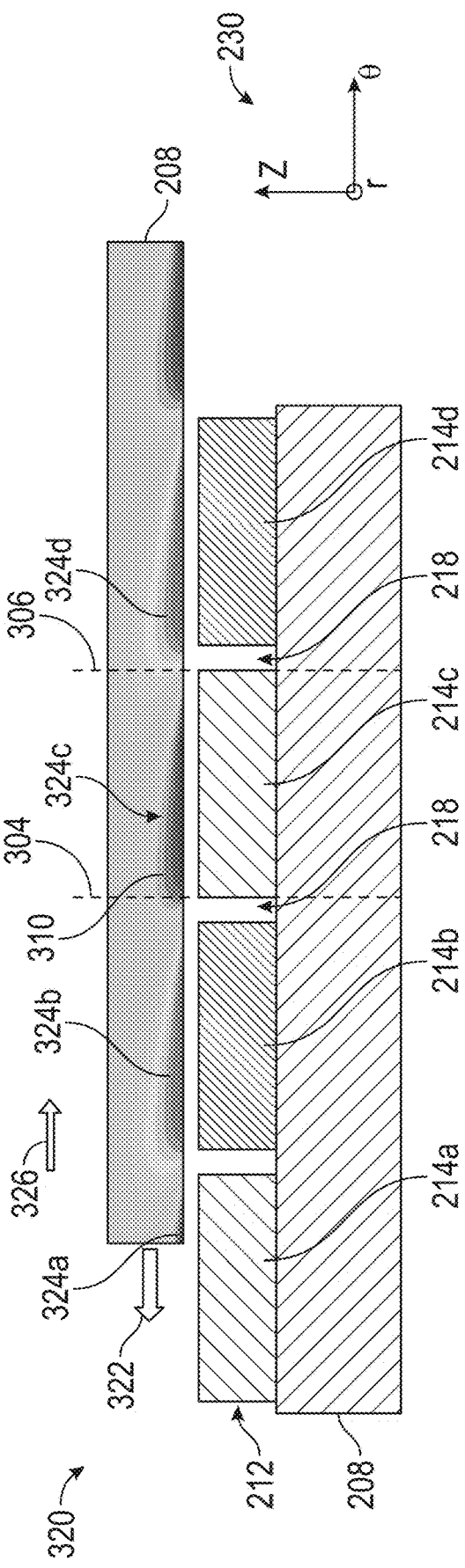

EDDY CURRENT DAMPER WITH ASYMMETRICAL FORCES

INTRODUCTION

The subject disclosure relates to a suspension system of a vehicle and, in particular, to a damper that provides asymmetrical forces at the suspension system.

A suspension system for a vehicle can employ a damper for absorbing forces applied to the suspension system. The suspension system converts a linear force to a rotation between a rotor and a stator at the damper. A compressive force generates a rotation in a first direction (i.e., counterclockwise) at the damper. A rebound force generates a rotation in a second direction (i.e., clockwise). The damper includes a rotor with a conductive disc that rotates with respect to a stator including a magnet. The magnet induces eddy currents in the conductive disc as a result of the rotation. The eddy currents in the conductive disc dampen or resist the rotary motion. A standard damper resists motion equally, regardless of the whether the rotor is rotating clockwise or counterclockwise. However, at a given velocity, suspension systems require rebound forces that are different in amplitude than compressive forces. Accordingly, it is desirable to provide a damper that can provide a resistance to the force that is asymmetrical (i.e., that is different depending on the direction of the rotation at the damper).

SUMMARY

In one exemplary embodiment, a method of dampening a force on a suspension system is disclosed. A relative rotation is generated between a first damping element and a second damping element of the suspension system in response to the force. An eddy current is induced in the first damping element during the relative rotation between the first damping element and the second damping element. A feature of at least one of the first damping element and the second damping element provides a first electrical resistance to the eddy current when the relative rotation is in a first direction and a second electrical resistance to the eddy current when the relative rotation is in a second direction, wherein the first electrical resistance generates a first damping force and the second electrical resistance generates a second damping force.

In addition to one or more of the features described herein, the first damping element includes a first backing and a conductor disc and the second damping element includes a second backing and the feature comprises at least one of a slot in the conductor disc tilted at a non-zero angle to an axis of rotation between the first damping element and the second damping element along a circumferential direction, wherein the slot is vacant, a slot in the conductor disc tilted at a non-zero angle to the axis of rotation along a circumferential direction, wherein the slot is filled with a conductive material, a cavity within the second backing tilted at a non-zero angle to the axis of rotation along a circumferential direction, and a cavity within the first backing tilted at a non-zero angle to the axis of rotation along a circumferential direction. The feature includes a plurality of plates of a conductor disc of the first damping element with the plurality of plates oriented at a non-zero angle to an axis of rotation between the first damping element and the second damping element along a circumferential direction, the plurality of plates forming an alternating pattern of a first set of plates having a first electrical conductivity and a second set of plates having a second electrical conductivity. The feature includes a plurality of plates places circumferentially around the first damping element and a plurality of permanent magnets placed circumferentially around the second damping element in which the number of plates within a unit circumferential length is different than a number of permanent magnets within the unit circumferential length. The feature includes a plurality of plates places circumferentially around the first damping element and a plurality of permanent magnets placed circumferentially around the second damping element in which wherein a magnetic axis of a permanent magnet is at a non-zero angle to a length axis of a plate. The first damping element and the second damping element are separated by a gap and one of a gap-facing surface of the first damping element forms a saw-tooth pattern along a circumferential direction, a gap-facing surface of the second damping element is at a non-zero angle to a plane of rotation, and both the gap-facing surface of the first damping element forms a saw-tooth pattern along the circumferential direction and the gap-facing surface of the second damping element is at a non-zero angle to the plane of rotation. In an embodiment, the feature includes a gap adjuster and the method further includes placing, via the gap adjuster, the first damping element at a first distance from the second damping element during relative rotation in the first direction and at a second distance from the second damping element during relative rotation in the second direction.

In another exemplary embodiment, a suspension system is disclosed. The suspension system includes a damper having a first damping element and a second damping element configured to rotate relative to each other in response to a force received at the suspension system, the second damping element inducing an eddy current in the first damping element during relative rotation. A feature of one at least one of the first damping element and the second damping element provides a first electrical resistance to the eddy current during relative rotation in a first direction and a second electrical resistance to the eddy current during relative rotation in a second direction, wherein the first electrical resistance generates a first damping force and the second electrical resistance generates a second damping force.

In addition to one or more of the features described herein, the first damping element includes a first backing and a conductor disc and the second damping element includes a second backing and the feature comprises at least one of a slot in the conductor disc tilted at a non-zero angle to an axis of rotation between the first damping element and the second damping element along a circumferential direction, wherein the slot is vacant, a slot in the conductor disc tilted at a non-zero angle to the axis of rotation along a circumferential direction, wherein the slot is filled with a conductive material, a cavity within the second backing tilted at a non-zero angle to the axis of rotation along a circumferential direction, and a cavity within the first backing tilted at a non-zero angle to the axis of rotation along a circumferential direction. The feature includes a plurality of plates of a conductor disc of the first damping element, the plurality of plates oriented at a non-zero angle to an axis of rotation between the first damping element and the second damping element along a circumferential direction, the plurality of plates forming an alternating pattern of a first set of plates having a first electrical conductivity and a second set of plates having a second electrical conductivity. The feature includes a plurality of plates placed circumferentially around the first damping element and a plurality of permanent magnets placed circumferentially around the second damping element in which the number of plates within a unit circumferential length is different than a number of permanent magnets within the unit circumferential length. The feature includes a plurality of plates places circumferentially around the first damping element and a plurality of permanent magnets placed circumferentially around the second damping element in which wherein a magnetic axis of a permanent magnet is at a non-zero angle to a length axis of a plate. The first damping element and the second damping element are separated by a gap and one of a gap-facing surface of the first damping element forms a saw-tooth pattern along a circumferential direction, a gap-facing surface of the second damping element is at a non-zero angle to a plane of rotation, and both the gap-facing surface of the first damping element forms a saw-tooth pattern along the circumferential direction and the gap-facing surface of the second damping element is at a non-zero angle to a plane of rotation. The suspension system further includes a gap adjuster configured to place the first damping element at a first distance from the second during relative rotation in the first direction and at a second distance from the second damping element during relative rotation in the second direction.

In yet another exemplary embodiment, a vehicle is disclosed. The vehicle includes a suspension system that receives a force, the suspension system including a damper having a first damping element and a second damping element, wherein the force induces a relative rotation between the first damping element and the second damping element and the second damping element induces an eddy current in the first damping element during the relative rotation. A feature of one at least one of the first damping element and the second damping element that provides a first electrical resistance to the eddy current during the relative rotation in a first direction and a second electrical resistance to the eddy current during the relative rotation in a second direction, wherein the first electrical resistance generates a first damping force and the second electrical resistance generates a second damping force.

In addition to one or more of the features described herein, the first damping element includes a first backing and a conductor disc and the second damping element includes a second backing and the feature comprises at least one of a slot in the conductor disc tilted at a non-zero angle to an axis of rotation between the first damping element and the second damping element along a circumferential direction, wherein the slot is vacant, a slot in the conductor disc tilted at a non-zero angle to the axis of rotation along a circumferential direction, wherein the slot is filled with a conductive material, a cavity within the first backing tilted at a non-zero angle to the axis of rotation along a circumferential direction, and a cavity within the first backing tilted at a non-zero angle to the axis of rotation along a circumferential direction. The feature includes a plurality of plates of a conductor disc of the first damping element, the plurality of plates oriented at a non-zero angle to an axis of rotation between the first damping element and the second damping element along a circumferential direction, the plurality of plates forming an alternating pattern of a first set of plates having a first electrical conductivity and a second set of plates having a second electrical conductivity. The feature includes a plurality of plates placed circumferentially around the first damping element and a plurality of permanent magnets placed circumferentially around the second damping element, and wherein one of the number of plates within a unit circumferential length is different than a number of permanent magnets within the unit circumferential length, and a magnetic axis of a permanent magnet is at a non-zero angle to a length axis of a plate. The first damping element and the second damping element are separated by a gap and one of a gap-facing surface of the first damping element forms a saw-tooth pattern along a circumferential direction, a gap-facing surface of the second damping element is at a non-zero angle to a plane of rotation, and both the gap-facing surface of the first damping element forms a saw-tooth pattern along the circumferential direction and the gap-facing surface of the second damping element is at a non-zero angle to the plane of rotation. The vehicle further includes a gap adjuster configured to place the first damping element at a first distance from the second damping element during the relative rotation in the first direction and at a second distance from the second damping element during relative rotation in the second direction.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3A shows a side view of a portion of the damper showing eddy currents generated during a first relative rotation;

FIG. 3B shows a side view of the damper showing eddy currents generated during a second relative rotation;

DETAILED DESCRIPTION

Figure 1:
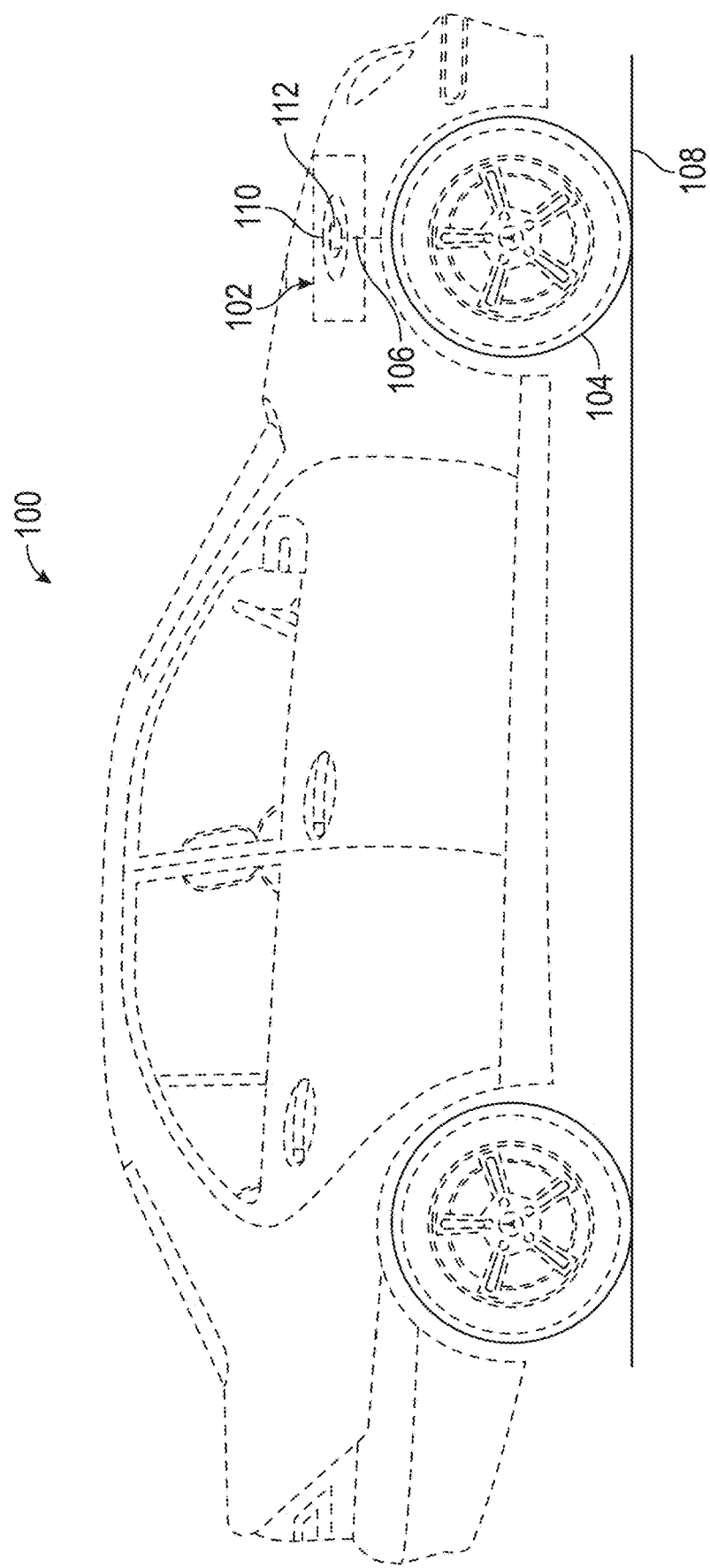
FIG. 1 shows a vehicle in an illustrative embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 100. The vehicle 100 includes a suspension system 102 coupled to a wheel 104 of the vehicle, via a rod, shaft or linkage 106. The linkage 106 moves up with respect to the suspension system 102 when a compressive force is applied to the wheel 104, such as by a bump in the road 108. The suspension system 102 allows relative motion between the vehicle 100 and the wheel 104 and regulates characteristics of this relative motion. The suspension system 102 includes a damper 110 and a cam 112 that converts the linear motion of the linkage 106 into a rotation at the damper. The damper 110 includes electrical components (shown in FIG. 2) which are housed inside a casing or housing and which are connected to other mechanical assemblies of the vehicle 100 such as a gearbox.

Figure 2:
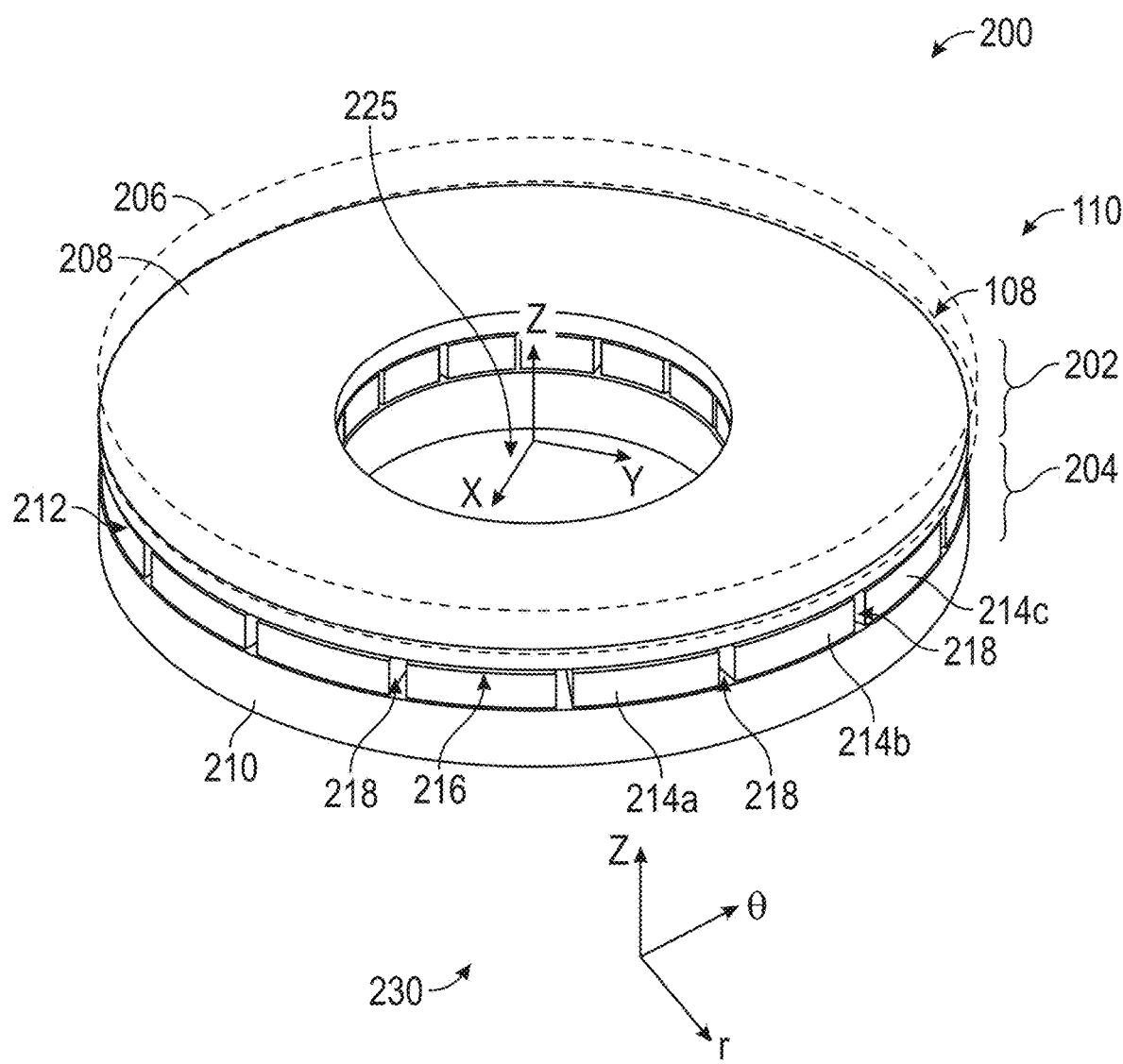
FIG. 2 shows a perspective view of electrical components of a damper of the vehicle, in an embodiment.

FIG. 2 shows a perspective view 200 of the electrical components of damper 110, in an embodiment. The damper 110 includes a first damping element 202 and a second damping element 204. In various embodiments, the damper 110 is an eddy current damper in which eddy currents are induced during relative rotation between the first damping element 202 and the second damping element 204. The induced eddy currents apply a retarding force or damping force in a direction opposite the direction of the relative rotation. The first damping element 202 includes electrically conductive components and the second damping element 204 includes magnetic components. The first damping element 202 can be one of a rotor or a stator while the second damping element 204 is the other of the rotor or stator. For purposes of illustration, the first damping element 202 is a rotor and the second damping element 204 is a stator.

The first damping element 202 includes a first backing 206 (shown in outline) and a conductor disc 208 made of an electrically conductive material, such as copper, cobalt, etc. The second damping element 204 includes a second backing 210 and a magnet layer 212 including a plurality of permanent magnets 214. In various embodiments, the permanent magnets are made of Neodymium (Nd), Samarium Cobalt (SmCo), etc. The first backing 206 and the second backing 210 can be made of a ferrous steel. Each of the first backing 206, conductor disc 208, second backing 210 and magnet layer 212 share an axis of rotation.

A Cartesian coordinate system 225 is shown to illustrate the arrangement of damping elements. Within the Cartesian coordinate system 225, the z-axis defines the axis of rotation axis. The x-y plane is parallel to a first plane including the first damping element 202 and a second plane including the second damping element 204.

The magnet layer 212 and the conductor disc 208 are separated by a stator-rotor gap 216. The permanent magnets 214 are separated from each other along the circumference of the magnet layer 212, with the orientation of the magnets alternating along the circumference between a first pole direction and a second (opposite) pole direction. Each permanent magnet 214 is separated from its neighboring permanent magnet in the circumferential direction by a magnet-magnet gap 218.

A cylindrical coordinate system 230 is also shown for ease of illustration with respect to FIGS. 3-11. The cylindrical coordinate system 203 includes a z-axis that defines the axis of rotation, a radial axis (r), and a circumferential axis (θ).

FIG. 3A shows a side view 300 of a portion of the damper 110 showing eddy currents generated during a first relative rotation. The side view 300 shows the conductor disc 208, second backing 210, and permanent magnets 214 of the magnets layer 212 as viewed along the radial axis of the cylindrical coordinate system 230. The conductor disc 208 is in rotation along a first direction 302 (i.e., +θ direction). Permanent magnets 214a-214d are shown for illustrative purposes. Permanent magnet 214c extends circumferentially from a first circumferential end 304 to a second circumferential end 306.

The rotation in the first direction generates eddy currents 308a-308d in the conductor disc 208. Each of the eddy currents 308a-308d arises in the conductor disc 208 at a location across from its respective permanent magnets 214a-214d. A density of the eddy currents 308a-308d increases in the direction of the rotation (i.e., +θ direction). Referring to eddy current 308c for illustrative purposes, the density of the eddy current 308c is lowest at the first circumferential end 304 and increases along the +θ direction to form a crown 310 at the second circumferential end 306. The crown 310 of the eddy current 310c extends over the magnet-magnet gap 218 between permanent magnet 214c and permanent magnet 214d. The eddy currents 308a-308d generate a first damping force 312 directed opposite the first direction (i.e., the −θ direction).

FIG. 3B shows a side view 320 of the damper 110 showing eddy currents generated during a second relative rotation. The damper 110 is viewed along the radial line of the cylindrical coordinate system 230. The conductor disc 208 is in rotation along a second direction 322 (i.e., −θ direction) opposite the first direction 302. The rotation in the second direction 322 generates eddy currents 324a-324d in which the density is lowest at the second circumferential end 306 and increases in the −θ direction to form crown 310 at the first circumferential end 304. The crown 310 of the eddy current 308c extends into the magnet-magnet gap 218 between permanent magnet 214b and permanent magnet 214c. The eddy currents 324a-324d generate a second damping force 326 directed in the first direction (i.e., the +θ direction).

Figure 4:
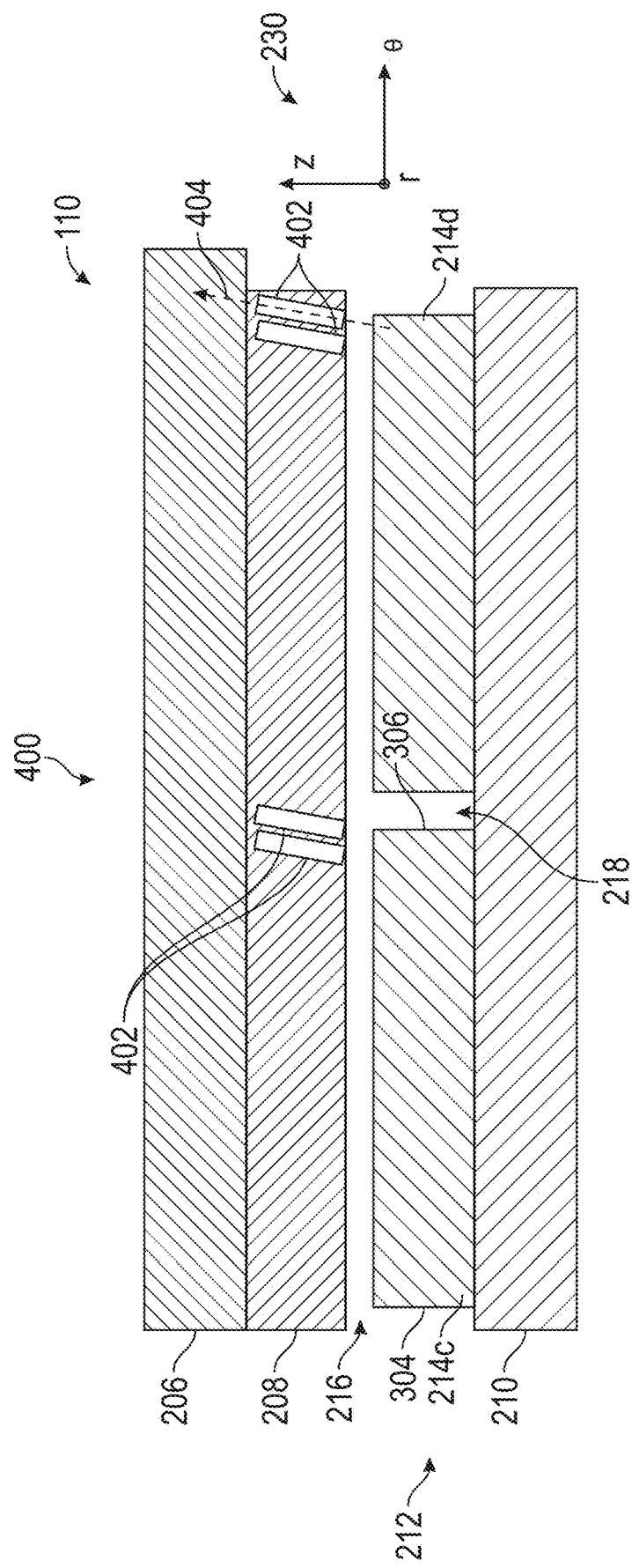
FIG. 4 shows a side view of the damper having a feature therein for providing an asymmetrical resistive force based on direction of relative rotation, in an embodiment.

FIG. 4 shows a side view of the damper 110 having a feature therein for providing an asymmetrical resistive force based on direction of relative rotation, in an embodiment. The damper 110 is viewed along a radial line of the cylindrical coordinate system 230. The asymmetrical feature includes one or more slots 402 in the conductor disc 208. The one or more slots 402 extend length-wise into the conductor disc 208 from the stator-rotor gap 216. A length axis 404 of the one or more slots 402 is tilted away from the positive z-axis in the positive circumferential (+θ) direction. The direction of tilt of the one or more slots 402 provides a low resistivity electrical path for the eddy currents (i.e., eddy currents 308a-308d) generated when the first damping element 202 is rotating in the first direction 302, FIG. 3A. As a result, the first damping force 312 has a relatively high magnitude. When the first damping element 202 is rotating in the second direction 322, FIG. 3B, the direction of tilt of the one or more slots 402 provides a high resistivity electrical path that suppresses the flow of eddy currents (i.e., eddy currents 324a-324d). As a result, the second damping force 326 has a relatively low magnitude.

Figure 5:
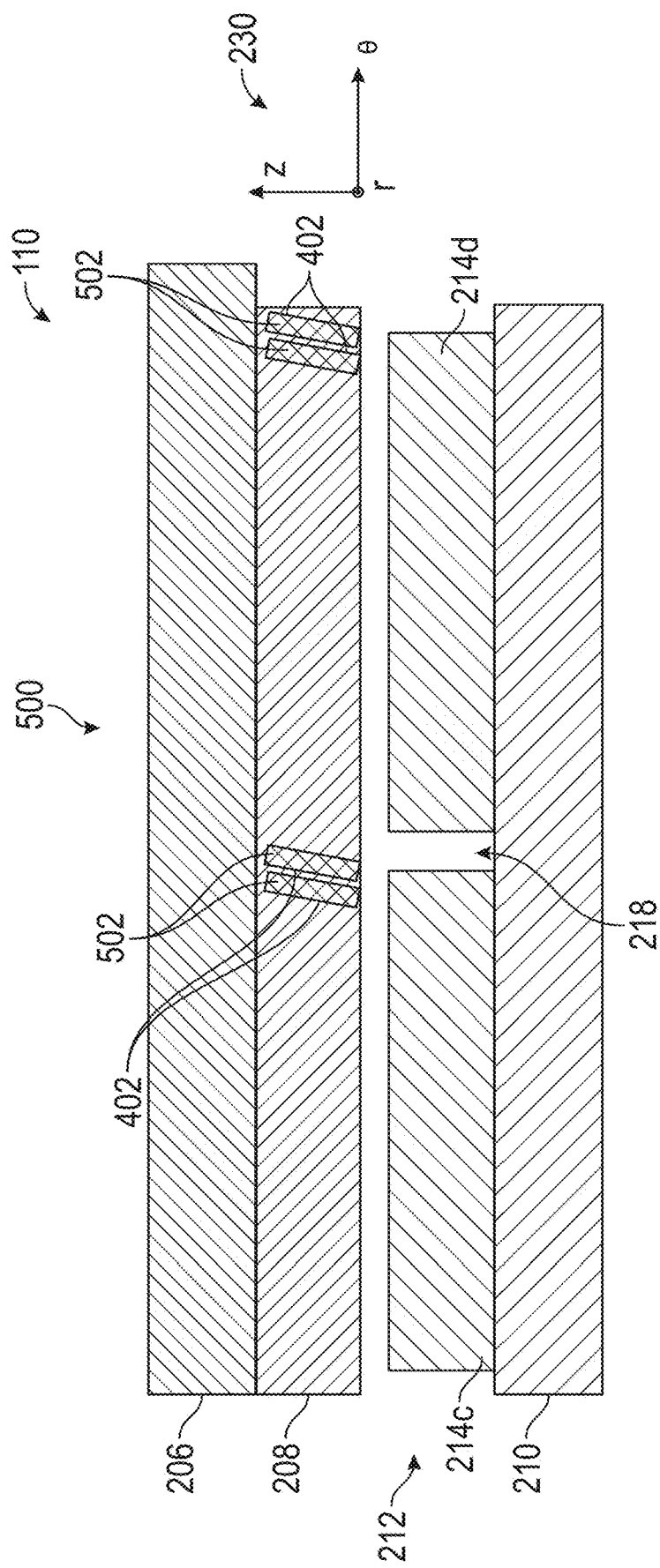
FIG. 5 shows a side view of the damper in an alternative embodiment.

FIG. 5 shows a side view 500 of the damper 110 in an alternative embodiment. When the conductive disc 208 is electrically ferromagnetic, the one or more slots 402 can be filled with laminated conductors or with an SMC (soft magnetic composite) material. Filling the one or more slots 402 reduces the appearance of slotting effects.

Figure 6:
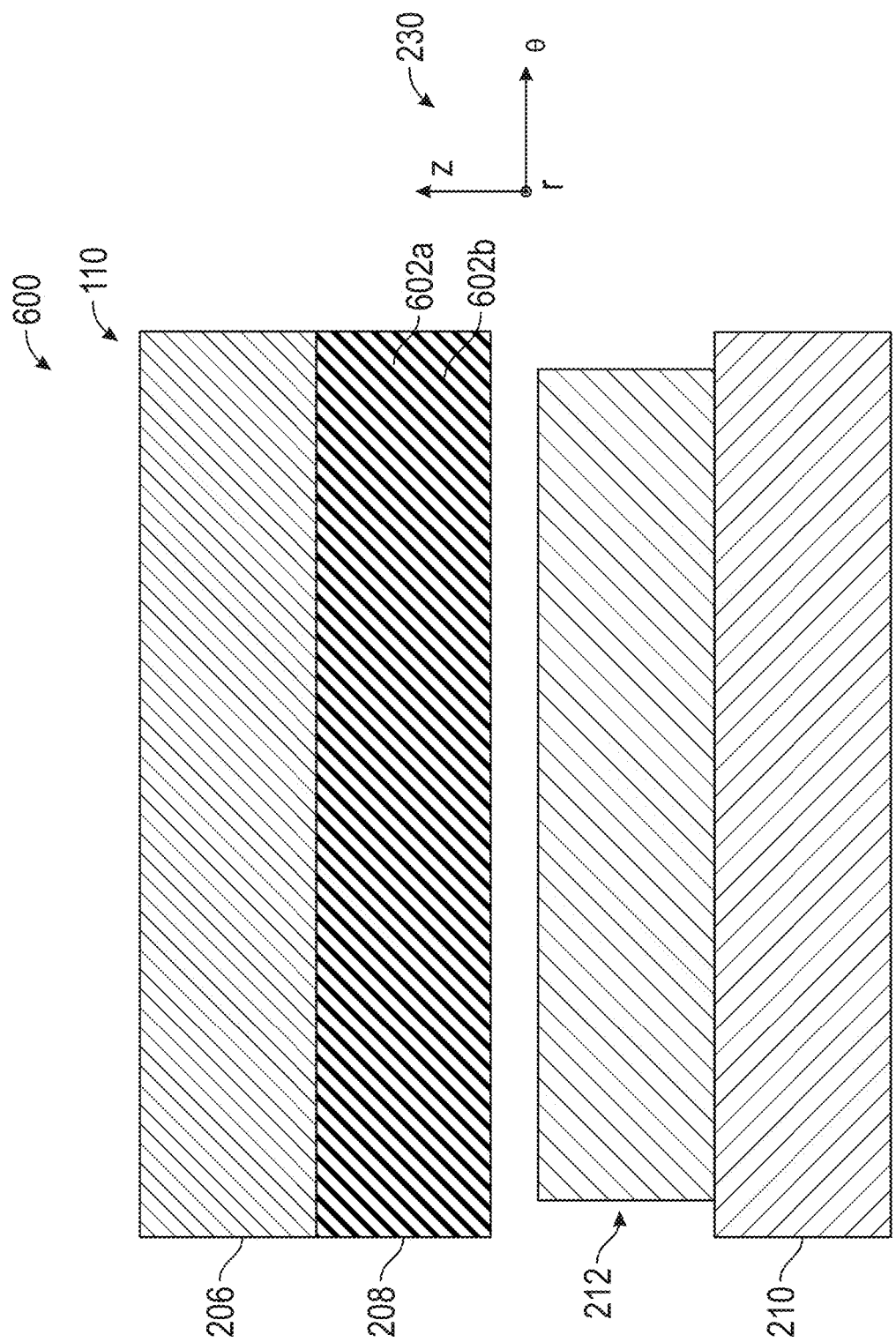
FIG. 6 shows a side view of the damper in an alternative embodiment.

FIG. 6 shows a side view 600 of the damper 110 in an alternative embodiment. The conductor disc 208 is composed of a plurality of plates 602 or thin, flat laminar structures. The plates 602 are placed against each other with their plate surfaces touching. The plates 602 are placed at angle to z-axis at a non-zero angle (in an orientation similar to the one or more slots 402 of FIG. 4) to generate asymmetrical suppression of the eddy currents. For the configuration shown in FIG. 6, the resulting first damping force is greater than the second damping force.

The plates 602 include a first set of plates 602a having a first electrical conductivity and a second set of plates 602b having a second electrical conductivity. The first set of plates 602a and the second set of plates 602b are arranged to form an alternating pattern along the circumferential direction. The difference in the resulting damping forces is directly proportional to the difference between the first electrical conductivity and the second electrical conductivity.

Figure 7:
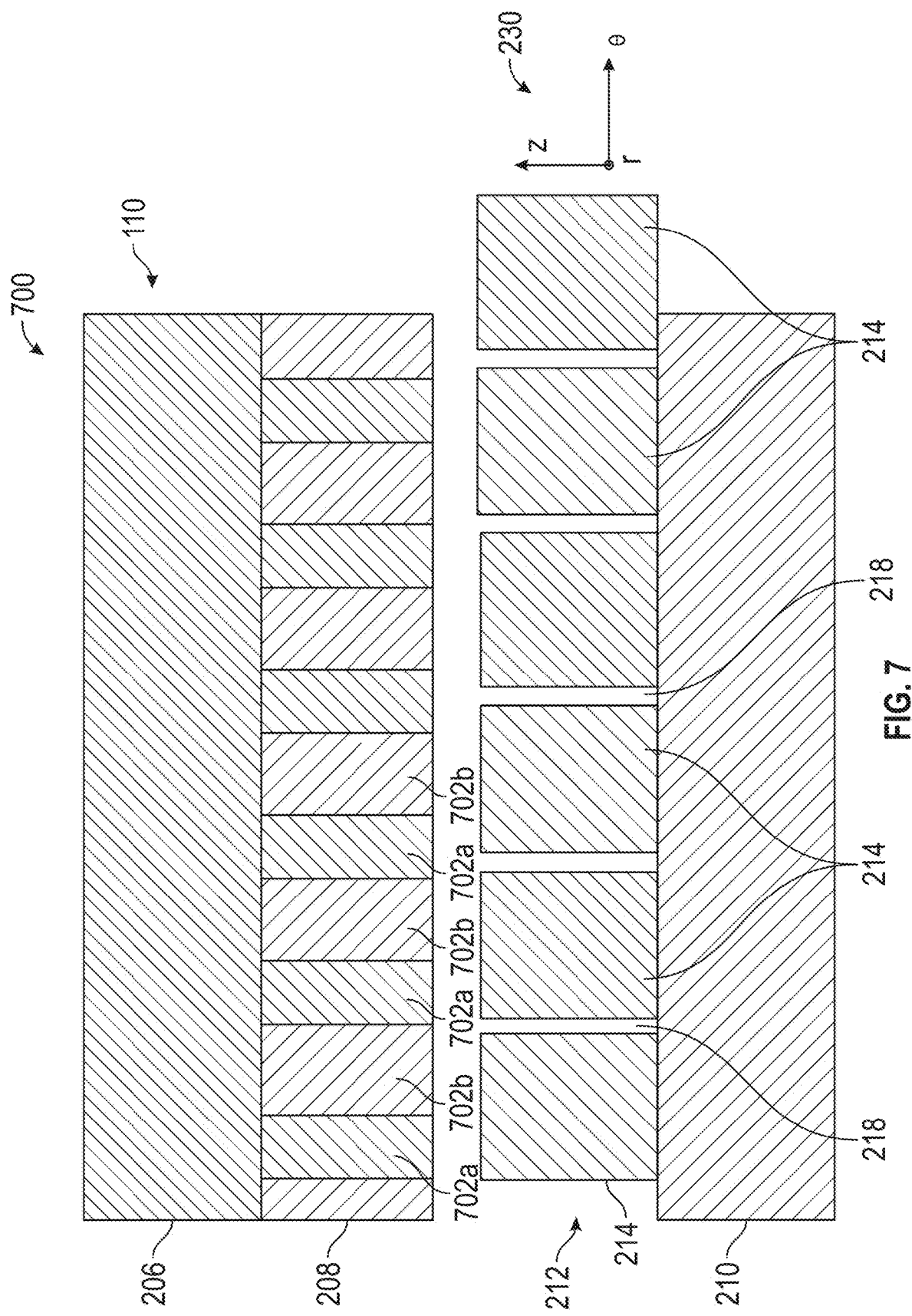
FIG. 7 shows a side view of the damper in an alternative embodiment.

FIG. 7 shows a side view 700 of the damper 110 in an alternative embodiment. The conductor disc 208 includes a first set of plates 702a having a first electrical conductivity and a second set of plates 702b having a second electrical conductivity, the first set of plates and the second set of plates form an alternating pattern along the circumferential direction. A length axis of the plates can be at a non-zero angle to the z-axis. Along a unit circumferential length, the number of plates 702 is different than the number of permanent magnets 214 in order to reduce the occurrence of ripple at the magnet-magnet gaps 218. For example, for a unit length, there can be 12 magnets and 13 plates.

Figure 8:
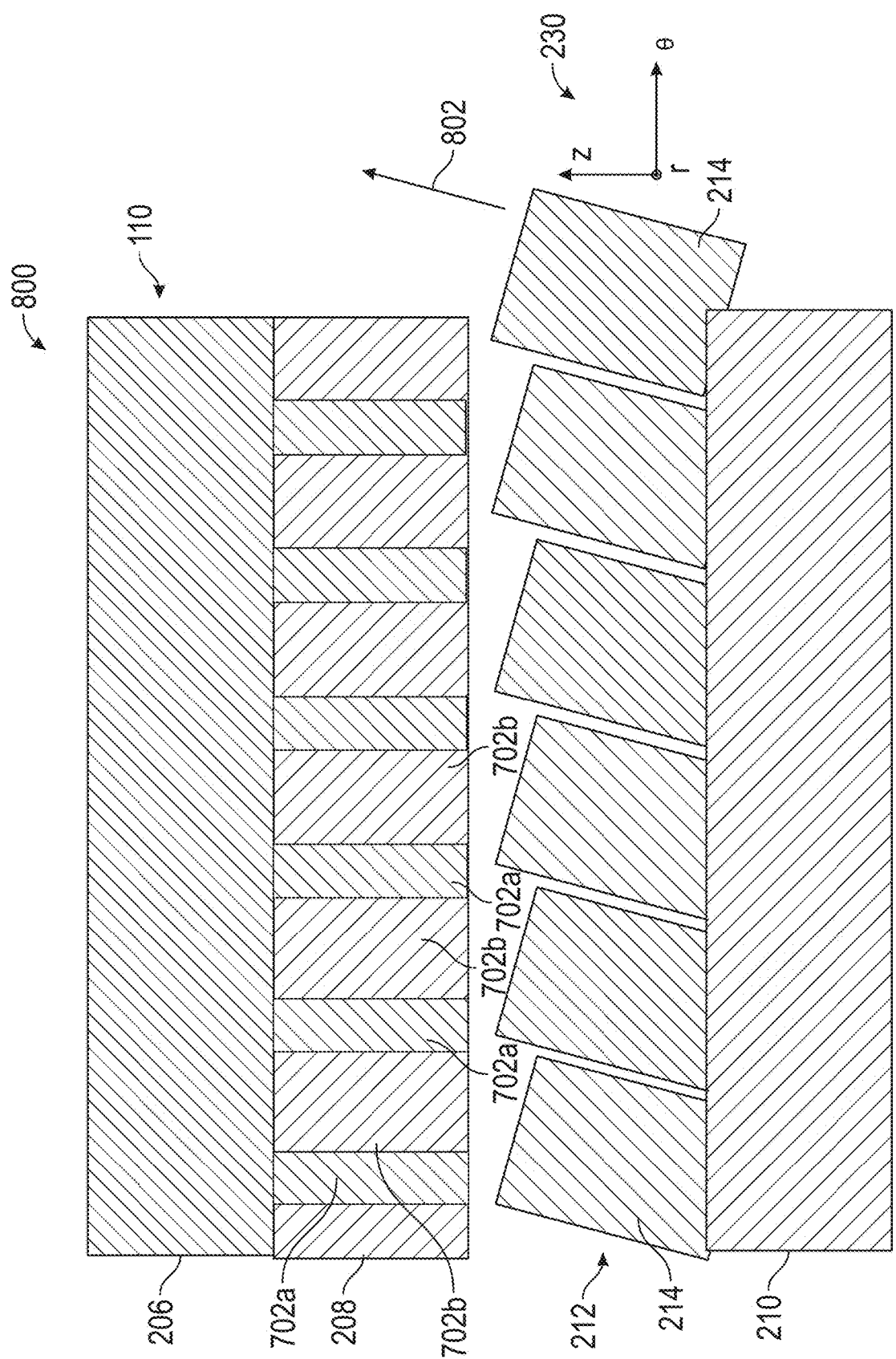
FIG. 8 shows a side view of the damper in an alternative embodiment.

FIG. 8 shows a side view 800 of the damper 110 in an alternative embodiment. The conductor disc 208 includes a first set of plates 702a having a first electrical conductivity and a second set of plates 702b having a second electrical conductivity, the first set of plates and the second set of plates form an alternating pattern along the circumferential direction. In a general sense, the orientation of the length axis of the plates is different than the orientation of the magnetic axes of the permanent magnets 214 to avoid ripple effects. As shown in the embodiment of FIG. 8, the length axis of the plates 702 are aligned along the z-axis and the magnetic axes of the permanent magnets 214 (see, for example, magnetic axis 802) are oriented at a non-zero angle with respect to the z-axis.

Figure 9:
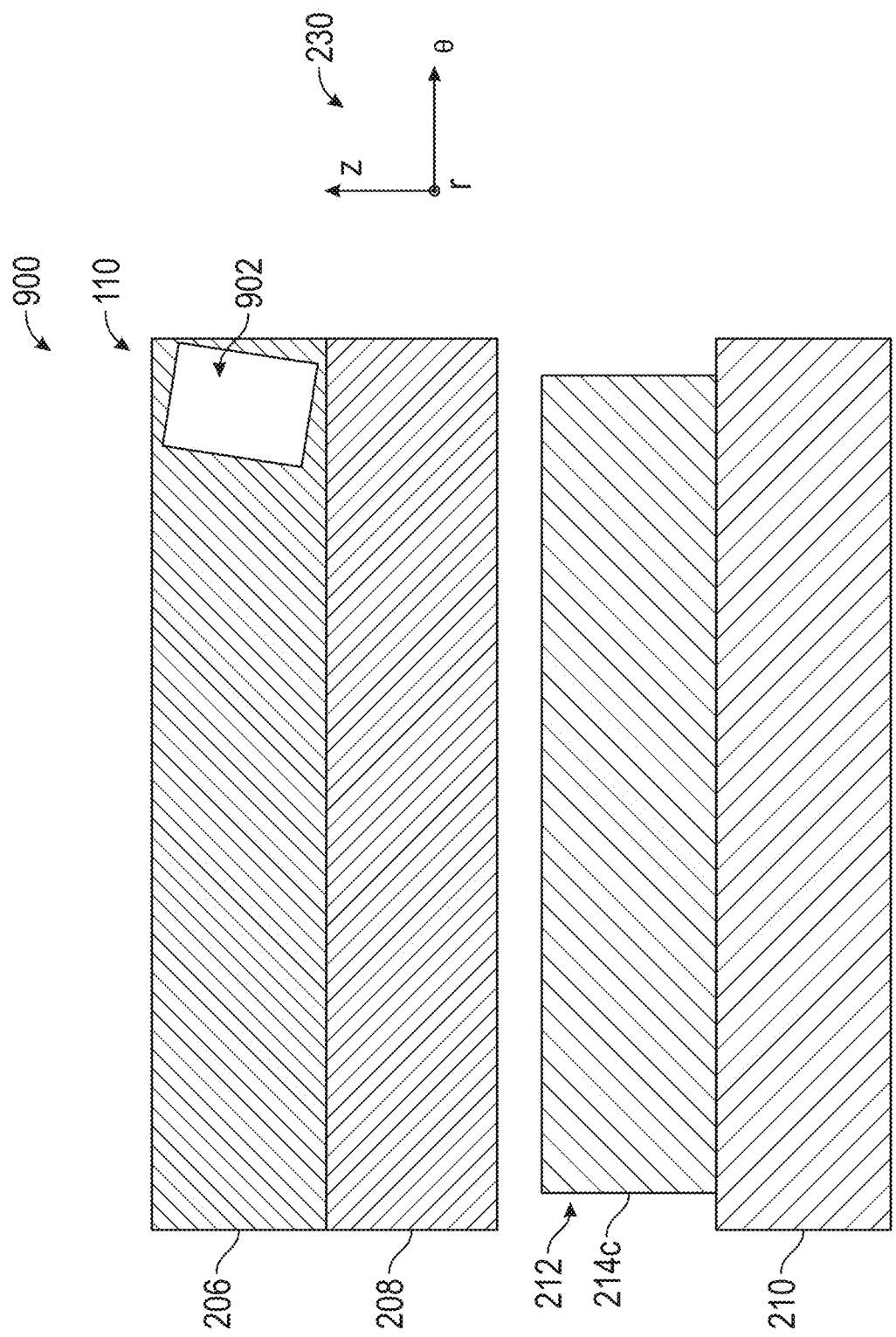
FIG. 9 shows a side view of the damper in an alternative embodiment.

FIG. 9 shows a side view 900 of the damper 110 in an alternative embodiment. The damper 110 is viewed along a radial line of the cylindrical coordinate system 230. The first backing 206 includes one or more cavities 902 formed therein. The one or more cavities 902 have an orientation similar to the one or more slots 402 of FIG. 4. The one or more cavities 902 can affect eddy currents generated in the conductor disc. Due to the orientation of the one or more cavities 902, the effect on the eddy current is asymmetrical (i.e., is different for rotation in the first direction versus rotation in the second direction). Due to the distance between the one or more cavities 902 and the eddy currents, the one or more cavities 902 is most effective at low rotational speeds.

Figure 10:
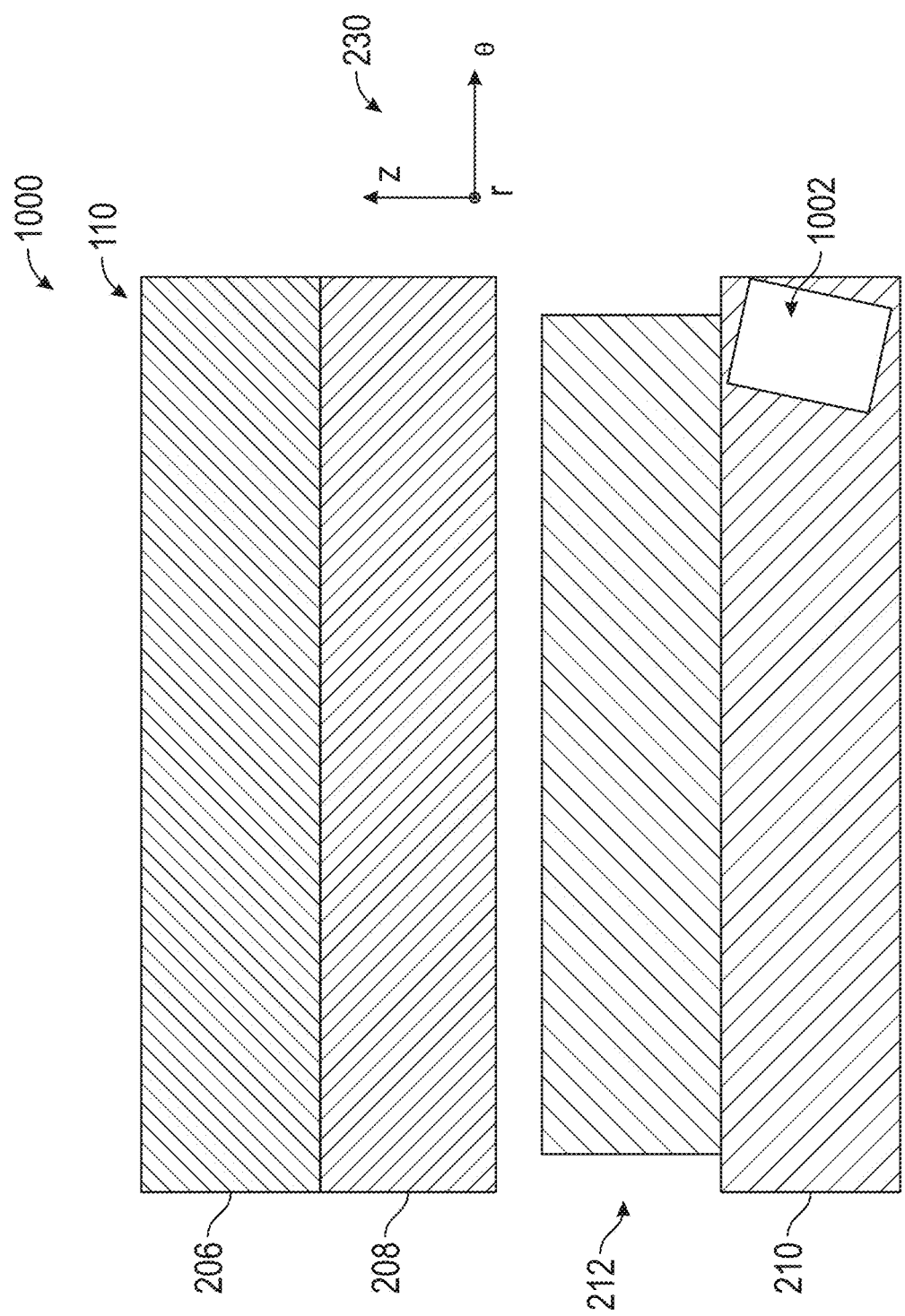
FIG. 10 shows a side view of the damper in an alternative embodiment.

FIG. 10 shows a side view 1000 of the damper 110 in another alternative embodiment. The second backing 210 includes one or more cavities 1002 formed therein. The one or more cavities 1002 have an orientation similar to the one or more cavities 902, FIG. 9 and can affect the eddy currents similarly. Due to the distance between the one or more cavities 1002 and the eddy currents, the one or more cavities 1002 are most effective at low rotational speeds.

Figure 11:
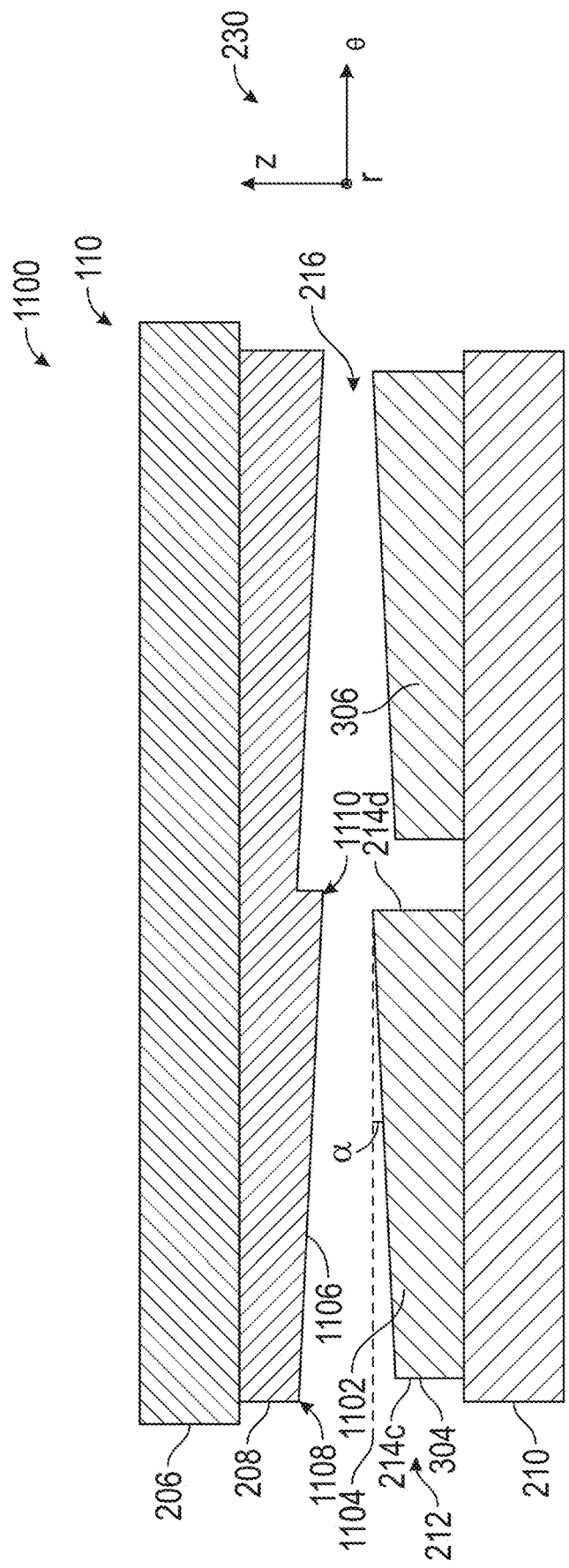
FIG. 11 shows a side view of the damper in an alternative embodiment.

FIG. 11 shows a side view 1100 of the damper 110 in an alternative embodiment. The permanent magnets having their magnetic axes oriented along the z-axis. However, a gap-facing magnet surface 1102 of each permanent magnet is at an angle α to a stator plane 1104 with the first circumferential end 304 being away from the stator-rotor gap 216 and the second circumferential end of the magnet being closer to the stator-rotor gap 216. The conductor disc 208 includes a surface 1106 that forms a sawtooth pattern, with a circumferential length of a face of the sawtooth pattern being slightly larger than the circumferential length of the magnet. A first sawtooth end 1108 is away from the stator-rotor gap 216 while the second sawtooth end 1110 is closer to the stator-rotor gap 216. When sawtooth face is aligned with a permanent magnet, the close ends are across from each other and the recessed ends are across from each other. Therefore, the eddy currents are affected differently when the rotor is rotating in the first direction than when the rotor is rotting in the second direction.

In a first alternative embodiment, the magnet surface lies in the horizontal plane while the conductor disc surface is a sawtooth pattern. In a second alternative embodiment, the magnet surfaces are angled while the surface of the conductor disc is flat (i.e., no sawtooth pattern).

Figure 12:
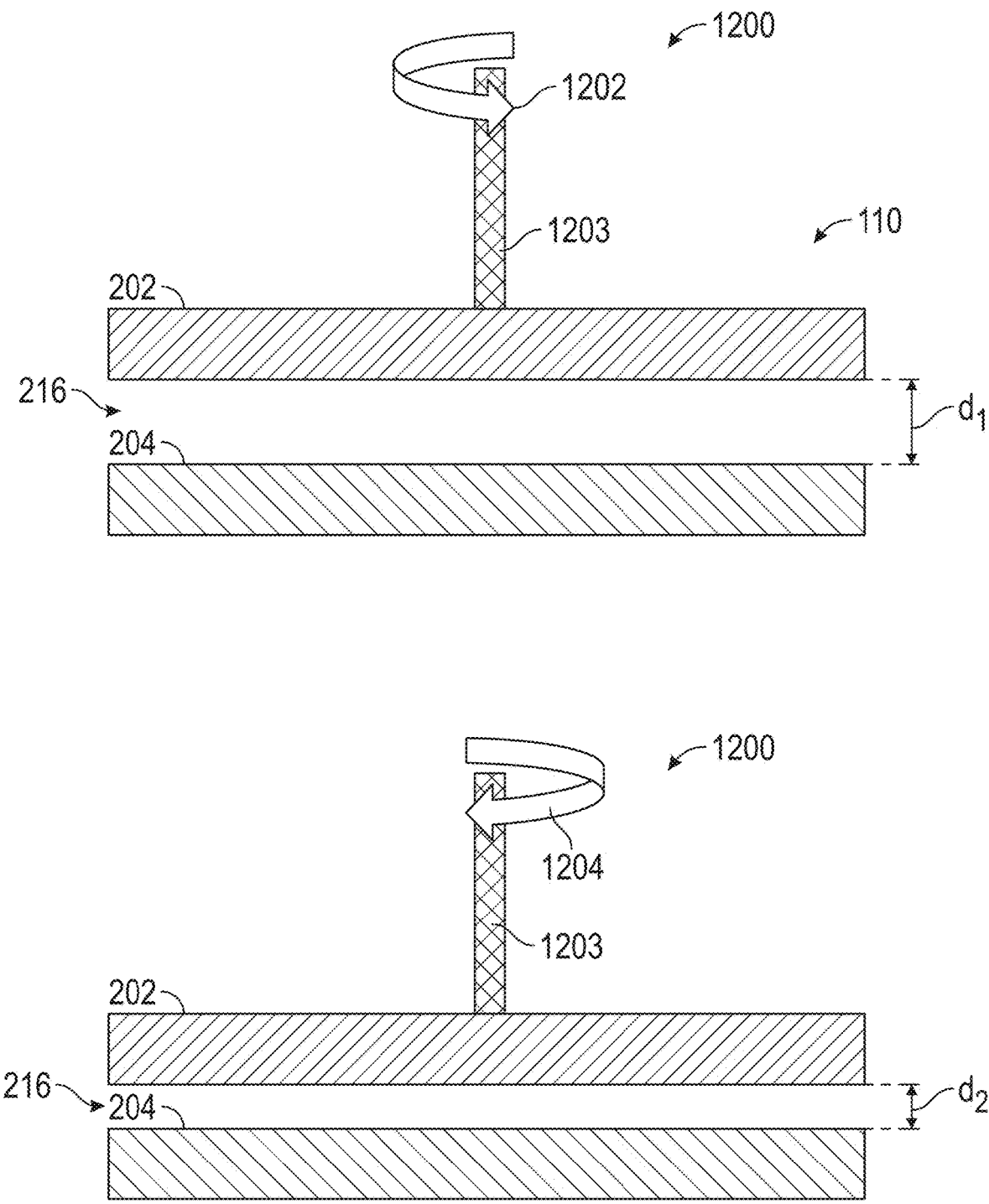
FIG. 12 shows a side view of the damper in an alternative embodiment.

FIG. 12 shows a side view of the damper 110 in an alternate embodiment. The damper 110 is shown in a first rotation 1202 and a second rotation 1204. The damper 110 includes a gap adjuster 1203 that adjusts a stator-rotor gap 216 based on the direction of rotation of the rotor 202. In the first rotation 1202, the first damping element 202 rotates in the first direction and is separated from the second damping element 204 by a first gap having width $d_1$. In the second rotation 1204, the first damping element 202 rotates in a second direction and is separated from the second damping element 204 by a second gap having width $d_2$. The first gap width $d_1$ is greater than the second gap width $d_2$. As a result, the first damping force (related to gap width $d_1$) is less than the second damping force (related to gap width $d_2$).

Figure 13:
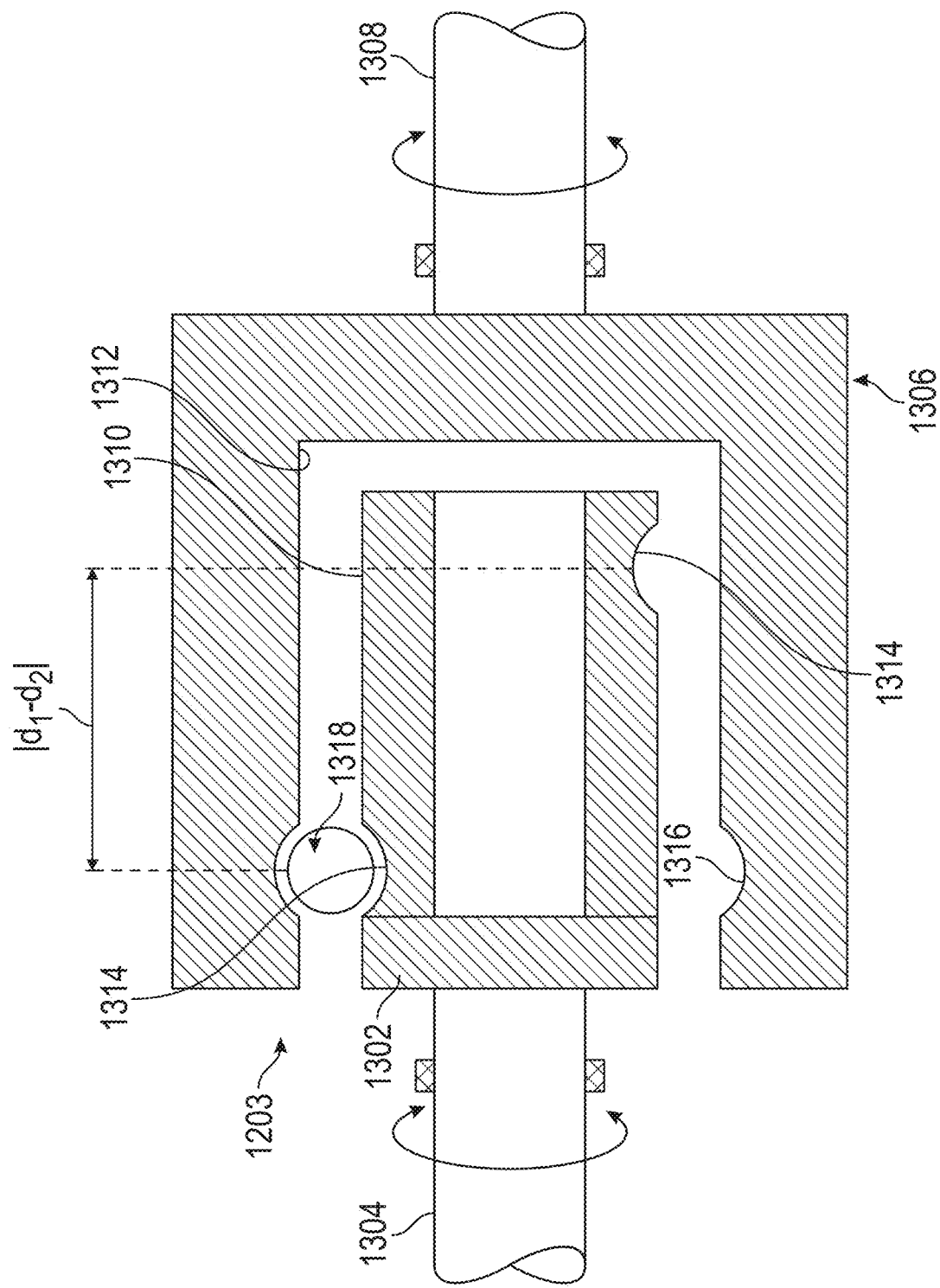
FIG. 13 shows a side view of a gap adjuster of the damper of FIG. 12, in an embodiment.

FIG. 13 shows a side view of the gap adjuster 1203 in an embodiment. The gap adjuster 1203 includes a rotor 1302 coupled to a driving shaft 1304. The rotor 1302 rotates within or inside of a housing 1306, which is coupled to a driven shaft 1308. The housing 1306 and the rotor 1302 are axially aligned with each other with an outer surface 1310 of the rotor 1302 adjacent to an inner surface 1312 of the housing 1306. The outer surface 1310 of the rotor 1302 includes an inner race 1314 that wraps helically around the outer surface. The inner surface 1312 of the housing 1306 includes an outer race 1316 that forms a circle at a single axial location. A ball 1318 resides between the inner race 1314 and the outer race 1316.

The driving shaft 1304 is rotated in a first direction with the ball 1318 residing between the circular outer race 1316 and the helical inner race 1314. Both races include stops at each end that aid in transferring the rotation of the rotor 1302 in either direction to a rotation of the housing 1306 in the same direction. When the driving shaft 1304 is rotating in a clockwise direction (as seen from the free end of the driving shaft), the ball 1318 takes up the position shown in FIG. 13. In this position, the ball 1318 is pressed between corresponding stops on both races and serves to transfer torque from the driving shaft 1304 to the driven shaft 1308. For a rotation in the opposite direction (i.e., second direction) the ball 1318 travels along the inner race 1314 until it is pressed between the other pair of corresponding stops on the inner race 1314 and the outer race 1316, allowing the transfer of torque from the driving shaft 1304 to the driven shaft 1308 in the second direction. As a consequence, the driving shaft 1304 is moved an axial distance $a=|d_1-d_2|$ with respect to the driven shaft 1308.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of dampening a force on a suspension system, comprising:
generating a relative rotation between a first damping element and a second damping element of the suspension system in response to the force; and
inducing an eddy current in the first damping element during the relative rotation between the first damping element and the second damping element;
wherein a feature of at least one of the first damping element and the second damping element provides a first electrical resistance to the eddy current when the relative rotation is in a first direction and a second electrical resistance to the eddy current when the relative rotation is in a second direction, wherein the first electrical resistance generates a first damping force and the second electrical resistance generates a second damping force.

2. The method of claim 1, wherein the first damping element includes a first backing and a conductor disc and the second damping element includes a second backing and the feature comprises at least one of: (i) a slot in the conductor disc tilted at a non-zero angle to an axis of rotation between the first damping element and the second damping element along a circumferential direction, wherein the slot is vacant; (ii) a slot in the conductor disc tilted at a non-zero angle to the axis of rotation along a circumferential direction, wherein the slot is filled with a conductive material; (iii) a cavity within the second backing tilted at a non-zero angle to the axis of rotation along a circumferential direction; and (iv) a cavity within the first backing tilted at a non-zero angle to the axis of rotation along a circumferential direction.

3. The method of claim 1, wherein the feature includes a plurality of plates of a conductor disc of the first damping element, the plurality of plates oriented at a non-zero angle to an axis of rotation between the first damping element and the second damping element along a circumferential direction, the plurality of plates forming an alternating pattern of a first set of plates having a first electrical conductivity and a second set of plates having a second electrical conductivity.

4. The method of claim 1, wherein the feature includes a plurality of plates places circumferentially around the first damping element and a plurality of permanent magnets placed circumferentially around the second damping element in which a number of plates within a unit circumferential length is different than a number of permanent magnets within the unit circumferential length.

5. The method of claim 1, wherein the feature includes a plurality of plates places circumferentially around the first damping element and a plurality of permanent magnets placed circumferentially around the second damping element in which wherein a magnetic axis of a permanent magnet is at a non-zero angle to a length axis of a plate.

6. The method of claim 1, wherein the first damping element and the second damping element are separated by a gap and one of: (i) a gap-facing surface of the first damping element forms a saw-tooth pattern along a circumferential direction; (ii) a gap-facing surface of the second damping element is at a non-zero angle to a plane of rotation; and (iii) both the gap-facing surface of the first damping element forms a saw-tooth pattern along the circumferential direction and the gap-facing surface of the second damping element is at a non-zero angle to the plane of rotation.

7. The method of claim 1, wherein the feature includes a gap adjuster, further comprising placing, via the gap adjuster, the first damping element at a first distance from the second damping element during relative rotation in the first direction and at a second distance from the second damping element during relative rotation in the second direction.

8. A suspension system, comprising:
a damper having a first damping element and a second damping element configured to rotate relative to each other in response to a force received at the suspension system, the second damping element inducing an eddy current in the first damping element during relative rotation; and
a feature of one at least one of the first damping element and the second damping element that provides a first electrical resistance to the eddy current during relative rotation in a first direction and a second electrical resistance to the eddy current during relative rotation in a second direction, wherein the first electrical resistance generates a first damping force and the second electrical resistance generates a second damping force.

9. The suspension system of claim 8, wherein the first damping element includes a first backing and a conductor disc and the second damping element includes a second backing and the feature comprises at least one of: (i) a slot in the conductor disc tilted at a non-zero angle to an axis of rotation between the first damping element and the second damping element along a circumferential direction, wherein the slot is vacant; (ii) a slot in the conductor disc tilted at a non-zero angle to the axis of rotation along a circumferential direction, wherein the slot is filled with a conductive material; (iii) a cavity within the second backing tilted at a non-zero angle to the axis of rotation along a circumferential direction; and (iv) a cavity within the first backing tilted at a non-zero angle to the axis of rotation along a circumferential direction.

10. The suspension system of claim 8, wherein the feature includes a plurality of plates of a conductor disc of the first damping element, the plurality of plates oriented at a non-zero angle to an axis of rotation between the first damping element and the second damping element along a circumferential direction, the plurality of plates forming an alternating pattern of a first set of plates having a first electrical conductivity and a second set of plates having a second electrical conductivity.

11. The suspension system of claim 8, wherein the feature includes a plurality of plates placed circumferentially around the first damping element and a plurality of permanent magnets placed circumferentially around the second damping element in which a number of plates within a unit circumferential length is different than a number of permanent magnets within the unit circumferential length.

12. The suspension system of claim 8, wherein the feature includes a plurality of plates places circumferentially around the first damping element and a plurality of permanent magnets placed circumferentially around the second damping element in which wherein a magnetic axis of a permanent magnet is at a non-zero angle to a length axis of a plate.

13. The suspension system of claim 8, wherein the first damping element and the second damping element are separated by a gap and one of: (i) a gap-facing surface of the first damping element forms a saw-tooth pattern along a circumferential direction; (ii) a gap-facing surface of the second damping element is at a non-zero angle to a plane of rotation; and (iii) both the gap-facing surface of the first damping element forms a saw-tooth pattern along the circumferential direction and the gap-facing surface of the second damping element is at a non-zero angle to a plane of rotation.

14. The suspension system of claim 8, further comprising a gap adjuster configured to place the first damping element at a first distance from the second during relative rotation in the first direction and at a second distance from the second damping element during relative rotation in the second direction.

15. A vehicle, comprising:
a suspension system that receives a force, the suspension system including a damper having a first damping element and a second damping element, wherein the force induces a relative rotation between the first damping element and the second damping element and the second damping element induces an eddy current in the first damping element during the relative rotation; and
a feature of one at least one of the first damping element and the second damping element that provides a first electrical resistance to the eddy current during the relative rotation in a first direction and a second electrical resistance to the eddy current during the relative rotation in a second direction, wherein the first electrical resistance generates a first damping force and the second electrical resistance generates a second damping force.

16. The vehicle of claim 15, wherein the first damping element includes a first backing and a conductor disc and the second damping element includes a second backing and the feature comprises at least one of: (i) a slot in the conductor disc tilted at a non-zero angle to an axis of rotation between the first damping element and the second damping element along a circumferential direction, wherein the slot is vacant; (ii) a slot in the conductor disc tilted at a non-zero angle to the axis of rotation along a circumferential direction, wherein the slot is filled with a conductive material; (iii) a cavity within the first backing tilted at a non-zero angle to the axis of rotation along a circumferential direction; and (iv) a cavity within the first backing tilted at a non-zero angle to the axis of rotation along a circumferential direction.

17. The vehicle of claim 15, wherein the feature includes a plurality of plates of a conductor disc of the first damping element, the plurality of plates oriented at a non-zero angle to an axis of rotation between the first damping element and the second damping element along a circumferential direction, the plurality of plates forming an alternating pattern of a first set of plates having a first electrical conductivity and a second set of plates having a second electrical conductivity.

18. The vehicle of claim 17, wherein the feature includes a plurality of plates placed circumferentially around the first damping element and a plurality of permanent magnets placed circumferentially around the second damping element, and wherein one of: (i) a number of plates within a unit circumferential length is different than a number of permanent magnets within the unit circumferential length; and (ii) a magnetic axis of a permanent magnet is at a non-zero angle to a length axis of a plate.

19. The vehicle of claim 17, wherein the first damping element and the second damping element are separated by a gap and one of: (i) a gap-facing surface of the first damping element forms a saw-tooth pattern along a circumferential direction; (ii) a gap-facing surface of the second damping element is at a non-zero angle to a plane of rotation; and (iii) both the gap-facing surface of the first damping element forms a saw-tooth pattern along the circumferential direction and the gap-facing surface of the second damping element is at a non-zero angle to the plane of rotation.

20. The vehicle of claim 17, further comprising a gap adjuster configured to place the first damping element at a first distance from the second damping element during the relative rotation in the first direction and at a second distance from the second damping element during relative rotation in the second direction.

* * * * *